(12) United States Patent
Tanaka

(10) Patent No.: US 8,651,675 B2
(45) Date of Patent: Feb. 18, 2014

(54) LIGHT-SHIELDING COATING AND OPTICAL ELEMENT

(75) Inventor: Yasuhiro Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 12/986,002

(22) Filed: Jan. 6, 2011

(65) Prior Publication Data

US 2011/0170196 A1 Jul. 14, 2011

(30) Foreign Application Priority Data

Jan. 8, 2010 (JP) ................. 2010-003328

(51) Int. Cl.
*G02B 27/00* (2006.01)
*G02B 5/02* (2006.01)

(52) U.S. Cl.
CPC .......... *G02B 5/0242* (2013.01); *G02B 27/0018* (2013.01); *G02B 5/0236* (2013.01)
USPC .......................................... 359/614; 359/601

(58) Field of Classification Search
USPC .......................................... 359/599, 601–614
See application file for complete search history.

(56) References Cited

U.S. PATENT DOCUMENTS

| | | | |
|---|---|---|---|
| 4,004,851 A * | 1/1977 | Negishi et al. | 359/614 |
| 6,890,590 B2 * | 5/2005 | Lin et al. | 427/164 |
| 8,393,742 B2 * | 3/2013 | Park et al. | 359/614 |
| 2004/0224187 A1 * | 11/2004 | Kang et al. | 428/697 |
| 2010/0178462 A1 * | 7/2010 | Yamamoto et al. | 428/141 |
| 2011/0200810 A1 * | 8/2011 | Kubota | 428/220 |
| 2011/0244219 A1 * | 10/2011 | Kubota | 428/323 |

FOREIGN PATENT DOCUMENTS

| | | |
|---|---|---|
| JP | 55-30029 B | 8/1980 |
| JP | 7-82510 A | 3/1995 |
| JP | 10-153704 A | 6/1998 |
| JP | 11-231545 A | 8/1999 |
| JP | 2004-359930 A | 12/2004 |

* cited by examiner

*Primary Examiner* — Thong Nguyen
(74) *Attorney, Agent, or Firm* — Canon U.S.A., Inc., IP Division

(57) ABSTRACT

The light-shielding coating contains (a) a resin, (b) a coloring material, (c) inorganic fine particles, and (d) a surfactant and/or an oil. The concentration of Component (d), the surfactant and/or the oil, is higher in the uppermost layer of the coating than in the lower layer. The content ratio of Component (d) is in the range of 10 to 40 weight % relative to the total weight of the light-shielding coating. The optical element features this light-shielding coating.

7 Claims, 2 Drawing Sheets

LIGHT-SHIELDING COATING AND OPTICAL ELEMENT

BACKGROUND OF THE INVENTION

1. Field of the Invention

The present invention relates to light-shielding coatings and optical elements, in particular, a light-shielding coating that absorbs stray light and an optical element featuring this light-shielding coating. Stray light in optical parts such as lenses and prisms may cause flare and ghost.

2. Description of the Related Art

Cameras, microscopes, and other optical apparatuses usually incorporate optical members, such as lenses and prisms, and may have its optical performance deteriorated owing to flare and ghost caused by the reflection of incidence light on the surfaces and the inner walls of the optical members (hereinafter, referred to as "surface reflection" and "inner reflection"). A known example of countermeasures against surface and inner reflection is antireflection coatings, which are obtained by applying black paint to the lateral sides of optical members.

Japanese Patent Publication No. 55-30029 has disclosed an antireflection coating composed of either coal tar or coal-tar pitch and a polymer containing bromine atoms, iodine atoms, or other kind of halogen atoms. Not only does this antireflection coating reduce inner reflection but it reduces surface reflection by its surface unevenness brought about by silica fine particles.

Japanese Patent Laid-Open No. 7-82510 has disclosed a paint composition composed of inorganic black fine particles. This paint composition also prevents inner reflection.

As mentioned in Japanese Patent Publication No. 55-30029, coatings composed of organic compounds such as coal tar and coal-tar pitch can be prevented from surface reflection in an ordinary way of matting materials, specifically, by making their surfaces rough with silica fine particles. However, coatings produced for the prevention of inner reflection usually contain high-refractive-index fine particles; when further treated with silica fine particles for the prevention of surface reflection, such coatings may have a seriously decreased refractive index owing to the association of the fine particles for the prevention of inner reflection and those for the prevention of surface reflection.

The coating disclosed in Japanese Patent Laid-Open No. 7-82510, which contains inorganic black fine particles, can admittedly prevent inner reflection thanks to the high refractive index of the resin contained therein, but it cannot prevent surface reflection effectively.

SUMMARY OF THE INVENTION

To solve the problems mentioned above, the present invention provides a light-shielding coating that prevents both surface reflection and inner reflection and an optical element featuring this light-shielding coating.

The light-shielding coating is a coating that contains the following:
(a) a resin;
(b) a coloring material;
(c) inorganic fine particles; and
(d) a surfactant and/or an oil, wherein
the concentration of Component (d), the surfactant and/or the oil, is higher in the uppermost layer of the coating than in the lower layer of the coating.

Further features of the present invention will become apparent from the following description of exemplary embodiments with reference to the attached drawings.

DESCRIPTION OF THE EMBODIMENTS

The following describes an embodiment of the present invention.

The light-shielding coating according to the present invention is a coating that contains the following:
(a) a resin;
(b) a coloring material;
(c) inorganic fine particles; and
(d) a surfactant and/or an oil, wherein
the concentration of Component (d), the surfactant and/or the oil, is higher in the uppermost layer of the coating than in the lower layer of the coating.

Component (c), inorganic fine particles (high-refractive-index fine particles), prevents inner reflection, and Component (d), a surfactant and/or an oil, prevents surface reflection. As a result, the light-shielding coating serves as an antireflection coating that can prevent both surface reflection and inner reflection when applied to an optical element.

Hereinafter, an embodiment of the present invention is detailed with reference to drawings.

Figure 1:
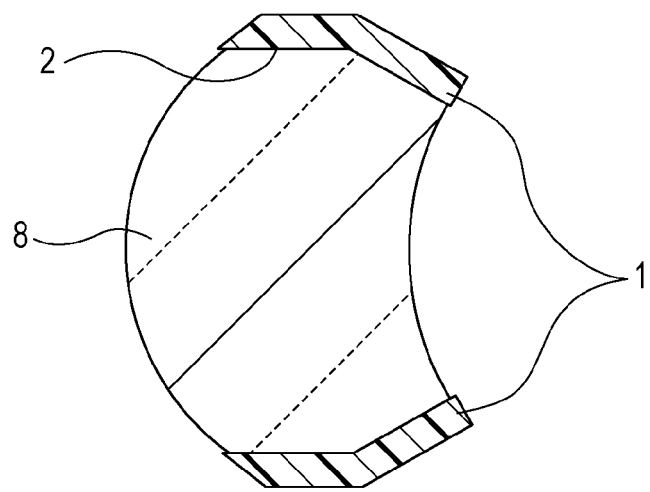
FIG. 1 is a schematic diagram that illustrates light-shielding coatings according to the present invention formed on the end faces of an optical lens.

As illustrated in FIG. 1, a light-shielding coating 1 according to this embodiment is applied to the end faces 2 of an optical lens 8 for optical elements. The end faces 2 are located out of the optically effective diameter of the optical lens 8.

Figure 2:
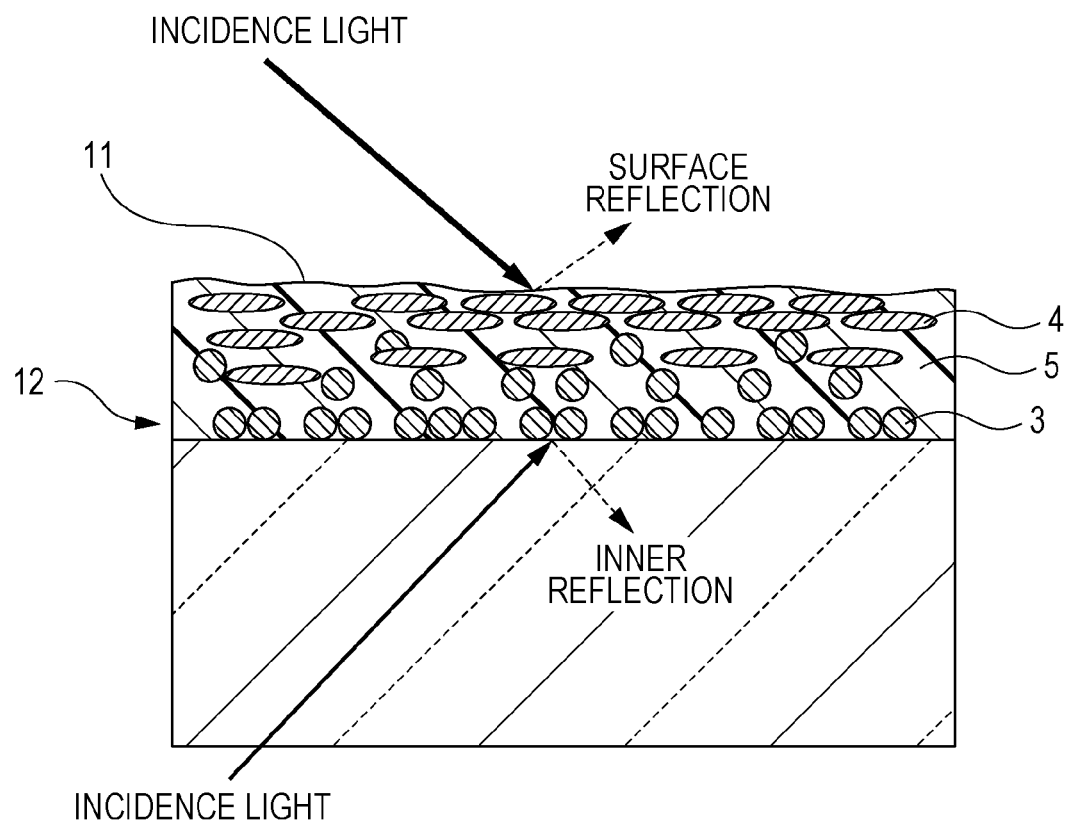
FIG. 2 is a cross-sectional view of a light-shielding coating according to an embodiment of the present invention.

FIG. 2 is a cross-sectional view of this light-shielding coating 1. As illustrated in this drawing, the light-shielding coating 1 contains resin 5, inorganic fine particles with a high refractive index (hereinafter, simply referred to as "the high-refractive-index fine particles") 3, and a surfactant and/or oil with a low refractive index (hereinafter, collectively referred to as "the low-refractive-index surfactant) 4; although not illustrated in the drawing, a coloring material is also contained.

This light-shielding coating can be obtained by application of a paint composition that contains the four components specified above, namely, (a) a resin, (b) a coloring material, (c) inorganic fine particles, and (d) a surfactant and/or an oil, as well as another component, (e) an organic solvent.

In this paint composition, the low-refractive-index surfactant 4 generally has a low specific gravity, and its value is on the order of 0.5 to 1.2 g/cm$^3$. The high-refractive-index fine particles 3 have a higher specific gravity, and its value is on the order of 2.7 to 4.0 g/cm$^3$. The paint composition starts to dry upon being applied to the end faces 2 as the organic solvent contained therein starts to evaporate. During this process, the heavier component, the high-refractive-index fine particles 3, goes down in the paint layer, and accordingly the lighter component, the low-refractive-index surfactant 4, goes up toward the surface of the paint layer. In the resultant dry coating, therefore, the low-refractive-index surfactant 4 has a higher concentration in the uppermost layer 11 of the coating than in the lower layer 12 as illustrated in FIG. 2. Note that the lower layer 12 constitutes the interface between each end face 2 and the coating, whereas the uppermost layer 11 constitutes the exposed surface of the coating.

In other words, this light-shielding coating is a gradient material in which the concentration of the low-refractive-index surfactant 4 is the highest at the top of the uppermost layer 11 and the lowest at the bottom of the lower layer 12; the refractive index thereof is the lowest at the top of the uppermost layer 11 and the highest at the bottom of the lower layer 12, namely, the interface between each end face 2 and the coating.

When entering an optical lens treated with this light-shielding coating, incidence light is hardly affected by surface reflection because the uppermost layer 11 has a refractive index close to that of the air ($n_d=1$). After entering the optical lens, incidence light is hardly affected by inner reflection on the end faces 2 of the optical lens because the interface between each end face 2 and the light-shielding coating, namely, the lower layer 12, in which the high-refractive-index fine particles 3 highly concentrate, has a refractive index as high as that of the optical lens.

In this way, this embodiment of the present invention provides a light-shielding coating that serves as an antireflection coating having the capability of preventing both surface reflection and inner reflection when applied to an optical element.

Hereinafter, the components of this light-shielding coating are individually described.

(a) Resin

In the light-shielding coating according to this embodiment, the resin 5 binds each end face 2 of an optical lens with the high-refractive-index fine particles 3. Depending on which coating formation process is chosen, the resin may be a thermoplastic resin, a thermosetting resin, or a radiation-curable resin.

Examples of thermoplastic resins that can be used here include acrylic resins, styrene resins, polycarbonate resins, polyester resins, olefin resins, silicone resins, fluororesins, norbornene resins, polyamide resins, polyimide resins, urethane resins, polyether resins, phenol resins, and aryl resins, related copolymer resins, and so forth. In particular, acrylic resins and polyimide resins are desirable because they ensure that the resultant light-shielding coating can strongly adhere to the end faces of an optical lens.

Examples of thermosetting or radiation-curable resins that can be used here include acrylic resins, styrene resins, polyester resins, urethane resins, silicone resins, fluororesins, and epoxy resins, mixed resins containing any one of them, and so forth. In particular, acrylic resins and epoxy resins are desirable because they also ensure that the resultant light-shielding coating can strongly adhere to the end faces of an optical lens.

As for amount, the content ratio of the resin is preferably in the range of 5 to 15 weight %, relative to the total weight of the light-shielding coating, and more preferably in the range of 7 to 12 weight %.

(b) Coloring Material

The coloring material contained in this light-shielding coating is an organic dye, an organic pigment, or the like.

Any kind of organic dye can be used as the coloring material as long as it absorbs visible light from 400 to 700 nm and is soluble in the organic solvent chosen, regardless of whether it is usually acknowledged as a dye. However, the ratio of the maximum absorbance to the minimum absorbance within the wavelength range of 400 to 700 nm should be at least 0.7. Insofar as this requirement is satisfied, the number of kinds of organic dyes is never limited to one; several kinds of organic dyes, for example, black, red, yellow, and blue organic dyes, may be mixed for any intended absorption wavelength.

As for the kind of organic dye, azo dyes are suitable because of their color variety. However, other kinds of dyes can also be used, for example: anthraquinone dyes, phthalocyanine dyes, stilbene dyes, pyrazolone dyes, thiazole dyes, carbonium dyes, and azine dyes. Dyes containing chromium or some other kind of metal are suitable because of the improved robustness of the resultant coating, more specifically, fastness to light, moisture, heat, and other ambient factors.

As for organic pigments, examples of red ones include the following: perylene pigments, lake pigments, azo pigments, quinacridone pigments, anthraquinone pigments, anthracene pigments, disazo pigments, isoindoline pigments, isoindolinone pigments, and so forth. These red pigments may be used singly or in combination of two or more kinds.

Examples of green organic pigments include the following: halogen-multisubstituted phthalocyanine pigments, halogen-multisubstituted copper phthalocyanine pigments, triphenylmethane-based basic pigments, disazo pigments, isoindoline pigments, isoindolinone pigments, and so forth. These green pigments may be used singly or in combination of two or more kinds.

Examples of blue organic pigments include the following: copper phthalocyanine pigments, indanthrone pigments, indophenol pigments, cyanine pigments, dioxazine pigments, and so forth. These blue pigments may be used singly or in combination of two or more kinds. In practical settings, pigments of the three primary colors are mixed.

As for amount, the content ratio of the coloring material is preferably in the range of 4 to 12 weight %, relative to the total weight of the light-shielding coating, and more preferably in the range of 5 to 9 weight %.

(c) Inorganic Fine Particles

Examples of the inorganic fine particles contained in the light-shielding coating, or the high-refractive-index fine particles, include the following: titanium oxide ($TiO_2$; refractive index: 2.71; specific gravity: 4.2 to 4.3), zirconium oxide ($ZrO_2$; refractive index: 2.10; specific gravity: 5.5), cerium oxide ($CeO_2$; refractive index: 2.20; specific gravity: 7.1), tin oxide ($SnO_2$; refractive index: 2.00; specific gravity: 7.0), antimony tin oxide (ATO; refractive index: 1.75 to 1.85; specific gravity: 6.6), indium tin oxide (ITO; refractive index: 1.95 to 2.00; specific gravity: 7.1), and so forth.

The refractive index of the inorganic fine particles is preferably in the range of 1.5 to 4.0 and more preferably in the range of 2.2 to 3.5.

The average diameter of the inorganic fine particles is preferably equal to or smaller than 40 nm and more preferably in the range of 10 to 30 nm.

As for amount, the content ratio of the inorganic fine particles is preferably in the range of 5 to 20 weight %, relative to the total weight of the light-shielding coating, and more preferably in the range of 10 to 15 weight %.

(d) Surfactant and/or Oil

The surfactant contained in the light-shielding coating is preferably a low-refractive-index surfactant, more specifically, a fluorosurfactant or a silicone surfactant.

As for fluorosurfactants, all types of them can be used here; nonionic, anionic, cationic, and amphoteric ones can be used. Examples of nonionic fluorosurfactants include lipophilic perfluoroalkyl oligomers, hydrophilic perfluoroalkyl oligomers, perfluoroalkyl ethylene oxide adducts, and so forth.

Examples of cationic fluorosurfactants include perfluoroalkyl quaternary ammonium salts and so forth. Examples of anionic fluorosurfactants include perfluoroalkyl surfonic acids, monovalent metal carboxylates, phosphoric acid esters, and so forth. And, examples of amphoteric fluorosurfactants include perfluoroalkyl betaines and so forth.

As for silicone surfactants, examples include the following: BYK-066N, BYK-141, BYK-302, BYK-307, BYK-310, BYK-333, BYK-370, and BYK-UV3510 (products from BYK Japan KK), SH193, SH30PA, and SH3746 (products from Dow Corning Toray Co., Ltd.), siloxanes such as polydimethylsiloxane and polyether-modified polydimethylsiloxane, and so forth.

The oil contained in the light-shielding coating is preferably a low-refractive-index oil, more specifically, a fluorine-containing oil or a silicone oil.

As for fluorine-containing oils, examples include perfluoropolyethers, perfluoroalkylpolyethers, trifluoroethylene polymers, and mixtures of them.

As for silicone oils, examples include dimethyl silicone oils, methyl phenyl silicone oils, methyl hydrogen silicone oils, polyether-modified silicone oils, epoxy-modified silicone oils, amino-modified silicone oils, carboxy-modified silicone oils, carbinol-modified silicone oils, and so forth.

The refractive index of Component (d), a surfactant and/or an oil, is preferably in the range of 1.2 to 1.4 and more preferably in the range of 1.25 to 1.38.

The content ratio of Component (d), a surfactant and/or an oil, is preferably in the range of 10 to 40 weight %, relative to the total weight of the light-shielding coating, and more preferably in the range of 11 to 38 weight %.

The optical element according to the present invention features this light-shielding coating. Specific applications of optical elements featuring the light-shielding coating include telephoto lenses for single-lens reflex cameras, lenses for digital cameras, and so forth.

Featuring the light-shielding coating that absorbs stray light, which may cause flare and ghost in such optical parts as the ones mentioned above, the optical element according to the present invention has good optical performance.

Preparing the Paint Composition

The light-shielding coating according to the present invention can be obtained by application of a paint composition that contains the four components specified above, namely, (a) a resin, (b) a coloring material, (c) inorganic fine particles, and (d) a surfactant and/or an oil, as well as another component, (e) an organic solvent. In the following exemplary preparation method, propylene glycol monomethyl ether (PGME) is used as the organic solvent.

An exemplary way of preparing the paint composition for forming the light-shielding coating is as follows. First, 10 g of a liquid epoxy resin (jER 828 from Mitsubishi Chemical Corporation), 4 g of a black dye (VALIFAST BLACK 3810; the VALIFAST products hereinafter are all from Orient Chemical Industries Co., Ltd.), 2.9 g of a red dye (VALIFAST RED 3320), and 0.375 g of a yellow dye (VALIFAST YELLOW 3108) are dissolved in 10 g of PGME in a 250-mL vessel designed for exclusive use with a non-vacuum planetary centrifugal mixer from Thinky Japan (THINKY Mixer). Then, 3 g of a silane coupling agent, 5 g of a fluorosurfactant, and 50 g of titania slurry (a product from Tayca Corporation) are added and mixed/dispersed in the resultant solution using the same mixer. This titania slurry contains $TiO_2$ fine particles (primary particle diameter: 20 nm) in solvent Methyl Proxitol at a content ratio of 25 weight %. The time of mixing/dispersion is set at 20 minutes. As for the examples and the comparative Examples described later, THINKY Mixer ARE-250 was used to mix/disperse the components and additives in the solvent.

Forming the Coating

Subsequently, the paint composition prepared is applied to form a coating. An exemplary way of forming the coating is as follows. First, a urethane sponge having holes arranged in series for the extrusion of the paint composition (Sofurasu from Fuji Chemical Industries, Ltd.) is impregnated with the paint composition, and this sponge is moved on the surface of a glass plate at a rate of 50 mm/second. The layer obtained is then baked at 80° C. for 120 minutes to provide the light-shielding coating according to the prevent invention.

The thickness of this light-shielding coating is usually in the range of 3 to 15 μm and preferably in the range of 5 to 10 μm.

Quantifying the Low-Refractive-Index Surfactant

The low-refractive-index surfactant (i.e., a surfactant and/or an oil) should be quantified, or in other words, the light-shielding coating should be assessed for the concentration gradient of the low-refractive-index surfactant therein, in order to confirm that its concentration is higher in the uppermost layer of the coating than in the lower layer.

For example, the coating was analyzed by Fourier-transform infrared spectrophotometry (FT-IR) along a cross-section thereof, on a spot-by-spot basis, from its surface to the interface with the material covered therewith (e.g., a lens). Comparison of the IR charts obtained for the uppermost layer (the exposed surface) of the coating and the lower layer (the interface with the covered material) has demonstrated that the closer to the interface with the covered material the measurement spot was, the smaller the absorption peak representing the low-refractive-index component (a fluorine-containing or silicone-based component) was.

In the uppermost layer (the exposed surface) of the coating, the concentration of the low-refractive-index surfactant is preferably in the range of 8 to 38 weight %, relative to the total weight of the light-shielding coating, and more preferably in the range of 10 to 35 weight %.

In the lower layer (the interface with the covered material) of the coating, the concentration of the low-refractive-index surfactant is preferably in the range of 1 to 30 weight %, relative to the total weight of the light-shielding coating, and more preferably in the range of 5 to 25 weight %. Note that the concentrations of the low-refractive-index surfactant in the uppermost and lower layers are based on the absorption peaks seen on the IR charts mentioned above.

Evaluating the Optical Performance

Figure 3:
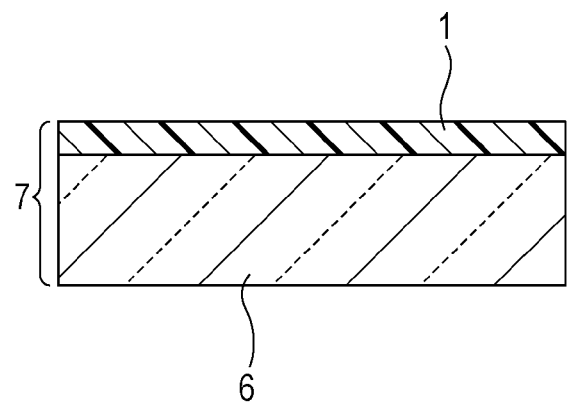
FIG. 3 is a schematic diagram that illustrates a test optical element.
Figure 4:
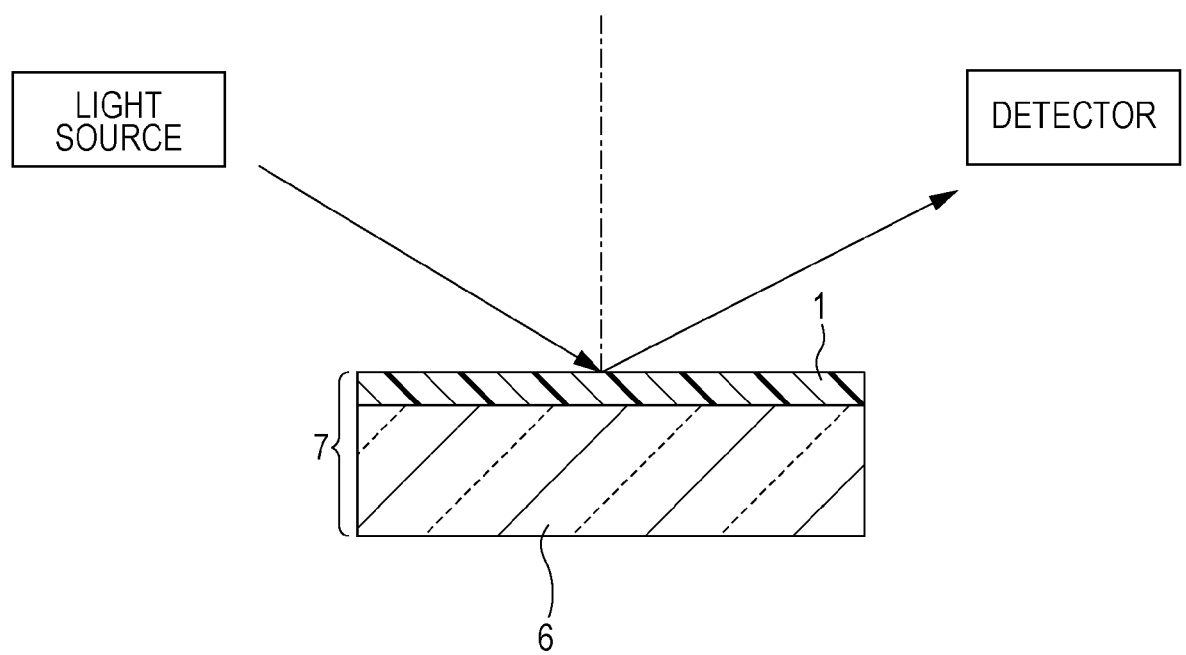
FIG. 4 is a schematic diagram that illustrates the measurement of surface reflectivity based on a spectrophotometer.

As illustrated in FIG. 3, a glass plate 6 was covered with a light-shielding coating 1 to provide a test sample 7. The glass plate 6 was made of LAH53, optical glass for the assessment of antireflection coatings ($n_d$=1.805), and the light-shielding coating 1 was prepared in the way specified above. The test sample 7 was then analyzed by spectrophotometry under the constitution illustrated in FIG. 4, and then the surface reflectivity was calculated from the intensity of the reflected light. More specifically, the test sample 7 was irradiated with visible light from 400 to 700 nm using a light source and a monochromator, the light reflected by the test sample 7 was quantified using a detector with an integrating sphere, and then the surface reflectivity was calculated from the intensity of reflected light obtained.

The inner reflectivity was also measured. The test sample used here was a triangular prism, which was made of S-LAH53 ($n_d$=1.805), measured 30 mm along its sides at right angles to each other, and had a thickness of 10 mm. This test sample was analyzed in an ASP spectrophotometer (ASP-32 from Bunkokeiki Co., Ltd.).

This ASP spectrophotometer supports free movement of the sample and detector so that they can be at any angle to each other, thereby allowing for the measurement of inner reflectivity with different incidence angles. Once emitted from the ASP spectrophotometer, light enters the triangular prism at initial incidence angles b of 30°, 45°, and 90° and undergoes refraction owing to the difference in refractive index between the ambient air and the prism. In an experiment the inventors made, the secondary incidence angles c (incidence angles after refraction) were 68.13°, 45°, and 36.73°. Note that each secondary incidence angle was calculated in accordance with the following equation:

$$n = \sin d / \sin e$$

where d represents the initial incidence angle, and e represents the secondary incidence angle.

After being refracted on entry into the triangular prism, the light is reflected on the bottom of the triangular prism and goes out. For visible light from 400 to 700 nm, the reflected light was quantified using a detector. Besides test samples, which were triangular prisms having had their bottom covered with the light-shielding coating according to the present invention, an untreated triangular prism was also analyzed in the way described above for background subtraction. Note that the inner reflectivity values presented in Tables 3 and 4 are the averages of measurements obtained by changing the wavelength from 400 nm to 700 nm by an increment of 1 nm.

Adhesion Test

The light-shielding coating was formed on the surface of a piece of optical glass, and then the adhesive strength of the coating was measured. More specifically, the pull-off method specified in JIS K5600-5-7 was performed using an adhesion tester from Cotec Corporation.

Hereinafter, the advantages of the present invention are further detailed with reference to examples and comparative examples.

EXAMPLE 1

A light-shielding coating for optical elements was produced in the following way.

First, in accordance with the formulation specified in Table 1, 10 g of an epoxy resin (Epikote 828 from Japan Epoxy Resin Co., Ltd.), 4 g of a black dye (VALIFAST BLACK 3810; the VALIFAST products hereinafter are all from Orient Chemical Industries Co., Ltd.), 2.9 g of a red dye (VALIFAST RED 3320), and 0.375 g of a yellow dye (VALIFAST YELLOW 3108) were put into a 250-mL vessel. This vessel was for exclusive use with a non-vacuum planetary centrifugal mixer from Thinky Japan (THINKY Mixer ARE-250).

To the obtained mixture, 50 g of the high-refractive-index fine particles (TiO$_2$ fine particles having an average diameter of 20 nm; ND139 from Tayca Corporation), 10 g of a solvent (PGME from Kishida Chemical Co., Ltd.), 3 g of a coupling agent (Shin-Etsu Silicones KBM-403; a product from Shin-Etsu Chemical Co., Ltd.), and 10 g of a fluorosurfactant (perfluoroalkyl ethylene oxide from DIC Corporation) were added.

The components and additives (resin, dyes, fine particles, coupling agent, and surfactant) were mixed and dispersed in the solvent for 20 minutes in the centrifugal mixer.

The paint composition obtained was applied to a smooth surface of a glass plate and then hardened by heating in a temperature-controlled bath at 80° C. for 2 hours to provide a light-shielding coating.

Spectrophotometric analysis of the coating for reflectivity gave the results presented in Table 3: surface reflectivity: 0.67%; inner reflectivity: 0.31%. (The reflectivity values are both the averages of measurements within the wavelength range of 400 to 700 nm. The same applies hereinafter.) Example 1 was superior to Comparative Example 1, which contained no surfactant, in surface reflectivity.

The concentration of the surfactant was 10 weight % in the uppermost layer of the coating and 5 weight % in the lower layer.

The adhesive strength between the glass plate and the coating was 12.9 MPa. In this example, good adhesion was obtained with no detachment observed. (The detailed test results for Examples 1 to 4 are summarized in Table 3.)

EXAMPLE 2

A paint composition was prepared in the same way as in Example 1 except that the amount of the fluorosurfactant was 50 g as specified in Table 1. Then, a light-shielding coating was produced in the same way as in Example 1.

Spectrophotometric analysis of the coating for reflectivity gave the following results: surface reflectivity: 0.61%; inner reflectivity: 0.35%.

The adhesive strength between the glass plate and the coating was 9.5 MPa. In this example, good adhesion was obtained with no detachment observed.

EXAMPLE 3

A paint composition was prepared in the same way as in Example 1 except that 10 g of a silicone oil (dimethyl silicone oil from Shin-Etsu Chemical Co., Ltd.) was used instead of the fluorosurfactant as specified in Table 1. Then, a light-shielding coating was produced in the same way as in Example 1.

Spectrophotometric analysis of the coating for reflectivity gave the following results: surface reflectivity: 0.69%; inner reflectivity: 0.33%.

The adhesive strength between the glass plate and the coating was 15.2 MPa. In this example, good adhesion was obtained with no detachment observed.

EXAMPLE 4

A paint composition was prepared in the same way as in Example 1 except that 50 g of a silicone oil (dimethyl silicone oil from Shin-Etsu Chemical Co., Ltd.) was used instead of the fluorosurfactant as specified in Table 1. Then, a light-shielding coating was produced in the same way as in Example 1.

Spectrophotometric analysis of the coating for reflectivity gave the following results: surface reflectivity: 0.64%; inner reflectivity: 0.37%.

The adhesive strength between the glass plate and the coating was 12.3 MPa. In this example, good adhesion was obtained with no detachment observed.

COMPARATIVE EXAMPLE 1

A paint composition was prepared in the same way as in Example 1 except that the low-refractive-index component was excluded as specified in Table 2. Then, a light-shielding coating was produced in the same way as in Example 1.

Spectrophotometric analysis of the coating for reflectivity gave the following results: surface reflectivity: 0.92%; inner reflectivity: 0.33%. Comparative Example 1 was inferior to Example 1 in surface reflectivity. (The detailed test results for Comparative Examples 1 to 4 are summarized in Table 4.)

COMPARATIVE EXAMPLE 2

A paint composition was prepared in the same way as in Example 1 except that the amount of the fluorosurfactant was 60 g (42 weight %) as specified in Table 2. Then, a light-shielding coating was produced in the same way as in Example 1.

Spectrophotometric analysis of the coating for reflectivity demonstrated favorable optical performance of Comparative Example 2. However, Comparative Example 2 was inferior in adhesive strength to Comparative Example 1, with a value of 6.5 MPa.

COMPARATIVE EXAMPLE 3

A paint composition was prepared in the same way as in Example 1 except that 5 g of methyl phenyl silicone oil ($n_d$=1.505) was used instead of the fluorosurfactant as specified in Table 2. Then, a light-shielding coating was produced in the same way as in Example 1.

Spectrophotometric analysis of the coating for reflectivity demonstrated poor optical performance of Comparative Example 3 with a surface reflectivity value of 0.85%.

COMPARATIVE EXAMPLE 4

A paint composition was prepared in the same way as in Example 1 except that the high-refractive-index $TiO_2$ fine particles had an average diameter of 60 nm as specified in Table 2. Then, a light-shielding coating was produced in the same way as in Example 1.

Spectrophotometric analysis of the coating for reflectivity demonstrated poor optical performance of Comparative Example 4 with a inner reflectivity value of 0.55%.

Note that for all examples and comparative examples, the light-shielding coating obtained had a thickness of 8.0 μm.

TABLE 1

| | | Example 1 | Example 2 | Example 3 | Example 4 |
|---|---|---|---|---|---|
| Resin | Material | Epoxy | Epoxy | Epoxy | Epoxy |
| | Trade name | Epikote 828 | Epikote 828 | Epikote 828 | Epikote 828 |
| | Manufacturer | Japan Epoxy Resin | Japan Epoxy Resin | Japan Epoxy Resin | Japan Epoxy Resin |
| | Amount (g) | 10 | 10 | 10 | 10 |
| Dye | Material | Azo dyes | Azo dyes | Azo dyes | Azo dyes |
| | Trade name | (1) VALIFAST BLACK 3810 (2) VALIFAST RED 3320 (3) VALIFAST YELLOW 3108 | (1) VALIFAST BLACK 3810 (2) VALIFAST RED 3320 (3) VALIFAST YELLOW 3108 | (1) VALIFAST BLACK 3810 (2) VALIFAST RED 3320 (3) VALIFAST YELLOW 3108 | (1) VALIFAST BLACK 3810 (2) VALIFAST RED 3320 (3) VALIFAST YELLOW 3108 |
| | Manufacturer | Orient Chemical Industries | Orient Chemical Industries | Orient Chemical Industries | Orient Chemical Industries |
| | Amount (g) | (1) 4.0 (2) 2.9 (3) 0.375 | (1) 4.0 (2) 2.9 (3) 0.375 | (1) 4.0 (2) 2.9 (3) 0.375 | (1) 4.0 (2) 2.9 (3) 0.375 |
| Fine particles | Material | $TiO_2$ (25 wt % solid in PGME) | $TiO_2$ (25 wt % solid in PGME) | $TiO_2$ (25 wt % solid in PGME) | $TiO_2$ (25 wt % solid in PGME) |
| | Trade name | ND139 | ND139 | ND139 | ND139 |
| | Manufacturer | Tayca | Tayca | Tayca | Tayca |
| | Average diameter (nm) | 20 | 20 | 20 | 20 |
| | Refractive index | 2.71 | 2.71 | 2.71 | 2.71 |
| | Amount (g) | 50 | 50 | 50 | 50 |
| Solvent | Material | PGME | PGME | PGME | PGME |
| | Amount (g) | 10 | 10 | 10 | 10 |
| Coupling agent | Material | Epoxy silane coupling agent | Epoxy silane coupling agent | Epoxy silane coupling agent | Epoxy silane coupling agent |
| | Trade Name | KBM-403 | KBM-403 | KBM-403 | KBM-403 |
| | Manufacturer | Shin-Etsu Chemical | Shin-Etsu Chemical | Shin-Etsu Chemical | Shin-Etsu Chemical |
| | Amount (g) | 3 | 3 | 3 | 3 |
| Surfactant | Material | Perfluoroalkyl ethylene oxide | Perfluoroalkyl ethylene oxide | — | — |
| | Trade name | N.A. | N.A. | — | — |
| | Manufacturer | DIC | DIC | — | — |
| | Refractive index | 1.255 | 1.255 | — | — |
| | Amount (g) | 10 | 50 | — | — |
| Oil | Material | — | — | Dimethyl silicone oil | Dimethyl silicone oil |
| | Trade name | — | — | KF96 | KF96 |
| | Manufacturer | — | — | Shin-Etsu Chemical | Shin-Etsu Chemical |
| | Refractive index | — | — | 1.375 | 1.375 |
| | Amount (g) | — | — | 10 | 50 |

TABLE 2

| | | Comparative Example 1 | Comparative Example 2 | Comparative Example 3 | Comparative Example 4 |
|---|---|---|---|---|---|
| Resin | Material | Epoxy | Epoxy | Epoxy | Epoxy |
| | Trade name | Epikote 828 | Epikote 828 | Epikote 828 | Epikote 828 |
| | Manufacturer | Japan Epoxy Resin | Japan Epoxy Resin | Japan Epoxy Resin | Japan Epoxy Resin |
| | Amount (g) | 10 | 10 | 10 | 10 |
| Dye | Material | Azo dyes | Azo dyes | Azo dyes | Azo dyes |
| | Trade name | (1) VALIFAST BLACK 3810 (2) VALIFAST RED 3320 (3) VALIFAST YELLOW 3108 | (1) VALIFAST BLACK 3810 (2) VALIFAST RED 3320 (3) VALIFAST YELLOW 3108 | (1) VALIFAST BLACK 3810 (2) VALIFAST RED 3320 (3) VALIFAST YELLOW 3108 | (1) VALIFAST BLACK 3810 (2) VALIFAST RED 3320 (3) VALIFAST YELLOW 3108 |
| | Manufacturer | Orient Chemical Industries | Orient Chemical Industries | Orient Chemical Industries | Orient Chemical Industries |
| | Amount (g) | (1) 4.0 (2) 2.9 (3) 0.375 | (1) 4.0 (2) 2.9 (3) 0.375 | (1) 4.0 (2) 2.9 (3) 0.375 | (1) 4.0 (2) 2.9 (3) 0.375 |
| Fine particles | Material | $TiO_2$ (25 wt % solid in PGME) | $TiO_2$ (25 wt % solid in PGME) | $TiO_2$ (25 wt % solid in PGME) | $TiO_2$ (25 wt % solid in PGME) |
| | Trade name | ND139 | ND139 | ND139 | ND139 |
| | Manufacturer | Tayca | Tayca | Tayca | Tayca |
| | Average diameter (nm) | 20 | 20 | 20 | 60 |
| | Refractive index | 2.71 | 2.71 | 2.71 | 2.71 |
| | Amount (g) | 50 | 50 | 50 | 50 |
| Solvent | Material | PGME | PGME | PGME | PGME |
| | Amount (g) | 10 | 10 | 10 | 10 |
| Coupling agent | Material | Epoxy silane coupling agent | Epoxy silane coupling agent | Epoxy silane coupling agent | Epoxy silane coupling agent |
| | Trade Name | KBM-403 | KBM-403 | KBM-403 | KBM-403 |
| | Manufacturer | Shin-Etsu Chemical | Shin-Etsu Chemical | Shin-Etsu Chemical | Shin-Etsu Chemical |
| | Amount (g) | 3 | 3 | 3 | 3 |
| Surfactant | Material | — | Perfluoroalkyl ethylene oxide | — | Perfluoroalkyl ethylene oxide |
| | Trade name | — | N.A. | — | N.A. |
| | Manufacturer | — | DIC | — | DIC |
| | Refractive index | — | 1.255 | — | 1.255 |
| | Amount (g) | — | 60 | — | 10 |
| Oil | Material | — | — | Methyl phenyl silicone oil | — |
| | Trade name | — | — | KF50 | — |
| | Manufacturer | — | — | Shin-Etsu Chemical | — |
| | Refractive index | — | — | 1.505 | — |
| | Amount (g) | — | — | 5 | — |

TABLE 3

| | | Example 1 | Example 2 | Example 3 | Example 4 |
|---|---|---|---|---|---|
| Light-shielding coating | Thickness of the coating (μm) | 8.0 | 8.0 | 8.0 | 8.0 |
| Surfactant concentration (wt %) | Uppermost layer | 10 | 35 | 10 | 35 |
| | Lower layer | 5 | 20 | 5 | 20 |
| Optical performance | Surface reflectivity (%) | 0.67 | 0.61 | 0.69 | 0.64 |
| | Inner reflectivity (%) | 0.31 | 0.35 | 0.33 | 0.37 |
| | Pass/Fail[1] | Passed | Passed | Passed | Passed |
| Adhesive test | Adhesive strength (MPa) | 12.9 | 9.5 | 15.2 | 12.3 |
| | Pass/Fail[2] | Passed | Passed | Passed | Passed |

[1] Passed: Surface reflectivity <0.70% and inner reflectivity <0.50%; Failed: Surface reflectivity ≥0.70% and/or inner reflectivity ≥0.50%
[2] Passed: Adhesive strength >9.0 MPa; Failed: Adhesive strength ≤9.0 MPa

TABLE 4

|  |  | Comparative Example 1 | Comparative Example 2 | Comparative Example 3 | Comparative Example 4 |
|---|---|---|---|---|---|
| Light-shielding coating | Thickness of the coating (μm) | 8.0 | 8.0 | 8.0 | 8.0 |
| Surfactant concentration (wt %) | Uppermost layer | 0 | 45 | 10 | 10 |
|  | Lower layer | 0 | 30 | 5 | 5 |
| Optical performance | Surface reflectivity (%) | 0.92 | 0.59 | 0.85 | 0.62 |
|  | Inner reflectivity (%) | 0.33 | 0.37 | 0.32 | 0.55 |
|  | Pass/Fail[1] | Failed | Passed | Failed | Failed |
| Adhesive test | Adhesive strength (MPa) | 16 | 6.5 | 14.6 | 15.1 |
|  | Pass/Fail[2] | Passed | Failed | Passed | Passed |

[1]Passed: Surface reflectivity <0.70% and inner reflectivity <0.50%; Failed: Surface reflectivity ≥0.70% and/or inner reflectivity ≥0.50%
[2]Passed: Adhesive strength >9.0 MPa; Failed: Adhesive strength ≤9.0 MPa Therefore, the present invention can provide a light-shielding coating that prevents both surface reflection and inner reflection as well as an optical element featuring this light-shielding coating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-003328 filed Jan. 8, 2010, which is hereby incorporated by reference herein in its entirety.

What is claimed is:

1. A light-shielding coating comprising:
   (a) a resin;
   (b) a coloring material;
   (c) an inorganic fine particle; and
   (d) a surfactant and/or an oil, wherein
   the concentration of Component (d), the surfactant and/or the oil, is higher in an uppermost layer of the coating than in a lower layer.

2. The light-shielding coating according to claim 1, wherein:
   a content ratio of the surfactant and/or the oil is in the range of 10 to 40 weight % relative to a total weight of the light-shielding coating.

3. The light-shielding coating according to claim 1, wherein:
   a refractive index of the surfactant and/or the oil is in the range of 1.2 to 1.4.

4. The light-shielding coating according to claim 1, wherein:
   a refractive index of the inorganic fine particle is in the range of 1.5 to 4.0.

5. The light-shielding coating according to claim 1, wherein:
   an average diameter of the inorganic fine particle is equal to or smaller than 40 nm.

6. An optical element comprising:
   an optical lens and
   the light-shielding coating according to claim 1 applied to a surface of the optical lens located out of an optically effective diameter of the optical lens.

7. The optical element according to claim 6, wherein:
   a surface of the optical lens located out of the optically effective diameter of the optical lens is an end face of the optical lens.

* * * * *